Patented Dec. 7, 1943

2,335,986

UNITED STATES PATENT OFFICE 2,335,986

VINYL RESIN PHONOGRAPH RECORD

Victor Yngve, Lakewood, Ohio, assignor to Carbide and Carbon Chemicals Corporation, a corporation of New York No Drawing. Application September 12, 1940, Serial No. 356,499

8 Claims. (Cl. 260—28)

This invention relates to improvements in phonograph records composed of vinyl resins whereby records having exceptional durability accompanied by a low degree of surface noise in the reproduction of sound are produced.

It has previously been proposed to fabricate vinyl resins into sound records having a low degree of noise level by incorporating small amounts only of fillers, such as diatomaceous earth, with the vinyl resins. However, such records, despite their superior qualities, have not come into widespread use because the large amounts of the relatively expensive vinyl resins required in their formulation render their cost considerably greater than the standard phonograph records having a shellac base.

According to this invention, regulated amounts of fillers having special characteristics are incorporated with vinyl resins in the production of phonograph records and, as a result of the nature of the fillers, the amounts of vinyl resins used may be minimized without any appreciable sacrifice in the playing qualities of the record. This purpose is achieved by using a mixture of two types of fillers, one being a finely-divided charcoal of vegetable origin and the other being a finely-divided inorganic filler of an abrasive nature, such as those materials having a hardness of at least 5 on Mohs' scale of hardness as exemplified by pulverized silica or diatomaceous earth. Preferably about four parts by volume of the charcoal filler to one part of the abrasive filler are employed. Volume ratios of the charcoal filler to the abrasive filler from 5:1 ranging to 3:8 may be used, although neither filler may be used exclusively in the large amounts economically desirable without inducing an undesirable degree of surface noise in the operation of the record. For the production of records having a minimum of surface noise, it is also essential that both the charcoal filler and the inorganic abrasive filler be finely divided and it is preferable that they pass a standard 300 mesh screen.

As a direct result of the incorporation of the mixed fillers above described, it has proved possible to employ amounts of these fillers in vinyl resin record formulations in excess of the amounts of vinyl resins themselves without any appreciable sacrifice in the playing qualities of the record and with increased resistance of the record to wear during operation.

Charcoal fillers of a vegetable origin differ materially from the carbon black and bone black pigments which have previously been used in small amounts in records containing vinyl resins. The charcoal fillers, in distinction to the carbon pigments, are not only of greater porosity but they also have a friable structure. As a consequence, any large particles present in the filler tend to break up into much finer particles during molding of the records. In this way, sound records having a low surface noise level are obtained. In addition, charcoal fillers of a vegetable origin can be used in greater quantities in the record composition than carbon black or bone black without increasing the consistency of the composition to a point where the impression of an accurate sound track during molding becomes difficult.

Charcoal fillers of a vegetable origin are understood to mean those charcoals directly derived from vegetable matter by partial ignition. Preferred grades are ordinary wood charcoal and charcoal obtained by calcining the waste sulfite liquors from paper mills which contain finely-divided wood pulp.

The vinyl resins which are preferred in the practice of this invention are described in the Groff Patent No. 1,932,889 and they are conjoint polymers of vinyl halides with vinyl esters of aliphatic acids containing combined vinyl halide in excess of 70% by weight. A particularly desirable resin of this class is a conjoint polymer of vinyl chloride with vinyl acetate containing 87% vinyl chloride and having an average macromolecular weight of about 10,000 as determined by Staudinger's method. Less desirably, other vinyl resins may be employed as the base of the sound records, such as the more highly polymerized polyvinyl acetate resins and the resins formed from them by their partial hydrolysis and subsequent reaction with aldehydes.

In the production of the molding compositions for forming the records a wide variety of the customary plasticizers, waxes, lubricants, heat stabilizers and pigments may be included. However, because of the large amount of the mixed fillers which are incorporated in the compositions of this invention, certain plasticizers have been found to be particularly effective in increasing the plasticity of the composition during molding without materially impairing the wearing qualities of the molded record. These are alkyl-substituted phenanthrenes, such as retene (1-methyl, 7-isopropyl phenanthrene), and the fatty acid pitches remaining as a residue from the distillation of fats, oils and waxes. These pitches are dark in color and the preferable ones for use in this invention have softening points of about 145° F. Both of these plasticizers are desirably used in amounts ranging from about 5% to about 25% by weight of the vinyl resin portion of the record.

Typical formulations which have been employed with success in the production of sound records are as follows:

|  | A | B | C |
|---|---|---|---|
|  | Parts by weight | Parts by weight | Parts by weight |
| Conjoint polymer of vinyl chloride with vinyl acetate | 48.3 | 52.7 | 41.5 |
| Diatomaceous earth—300 mesh | 17.0 | 25.8 | 32.7 |
| Vegetable charcoal—300 mesh | 33.0 | 19.8 | 17.0 |
| Calcium stearate | 0.85 | 0.85 |  |
| Carnauba wax | 0.85 | 0.85 |  |
| Retene |  |  | 5.5 |
| Ceresin wax |  |  | 0.76 |
| Lead stearate |  |  | 0.76 |
| White lead |  |  | 0.28 |
| Carbon black pigment |  |  | 1.5 |

Records may be formed from these compositions by first mixing the ingredients in a heated dough-type mixer until homogeneous and then pressing the composition into preforms. This may be done at temperatures of 130° to 150° C. and at pressures up to 2000 pounds per square inch. The impression of the sound groove is then accomplished by pressing the heated preforms against an appropriate die. Records made in this manner were found to exhibit very low initial noise level and they retained this quality after many playings. Likewise, the records did not show excessive wear even after repeated playings as was evidenced by the facts that there was no appreciable distortion of the recorded sound and that close inspection of the record with the aid of a magnifying lens did not reveal any unusual aberrations in the sound track.

Modifications of the invention other than as described in the foregoing examples will be readily apparent to those skilled in the art and are included within the scope of the invention as defined by the appended claims. This invention contains subject matter in common with my copending application, Serial No. 356,525, filed September 12, 1940, now Patent No. 2,307,091.

I claim:

1. A phonograph record comprising a vinyl resin base, composed of a conjoint polymer of a vinyl halide with a vinyl ester of an aliphatic acid, and a mixed filler in an amount at least about equal by weight to said vinyl resin, said mixed filler containing a substantial proportion each of finely-divided charcoal of vegetable origin and finely-divided inorganic abrasive material having a hardness of at least 5 on Mohs' scale.

2. A phonograph record comprising a vinyl resin base, composed of a conjoint polymer of a vinyl halide with a vinyl ester of an aliphatic acid, and a mixed filler in an amount at least about equal by weight to said vinyl resin, said mixed filler containing finely-divided charcoal of vegetable origin and finely-divided inorganic abrasive material having a hardness of at least 5 on Mohs' scale, the volume ratio of said charcoal to said abrasive material being between about 5:1 and about 3:8.

3. A phonograph record comprising a vinyl resin base, composed of a conjoint polymer of vinyl chloride with vinyl acetate, and a greater amount by weight than said vinyl resin of a mixed filler containing a substantial proportion each of finely-divided charcoal of vegetable origin and finely-divided inorganic abrasive material having a hardness of at least 5 on Mohs' scale.

4. A molding composition for phonograph records comprising a vinyl resin base, composed of a conjoint polymer of vinyl chloride with vinyl acetate, and a mixed filler in an amount at least about equal by weight to said vinyl resin, said mixed filler containing a substantial proportion each of finely-divided charcoal of vegetable origin and finely-divided inorganic abrasive material having a hardness of at least 5 on Mohs' scale.

5. A phonograph record comprising a vinyl resin base, composed of a conjoint polymer of vinyl chloride with vinyl acetate, and a greater amount by weight than said vinyl resin of a mixed filler containing finely-divided charcoal of vegetable origin and diatomaceous earth, the volume ratio of said charcoal to said abrasive material being between about 5:1 and about 3:8.

6. A phonograph record comprising a vinyl resin base, composed of a conjoint polymer of vinyl chloride with vinyl acetate, a mixed filler in an amount at least about equal by weight to said vinyl resin, said mixed filler containing a substantial proportion each of finely-divided charcoal of vegetable origin and finely-divided inorganic abrasive material having a hardness of at least 5 on Mohs' scale, and a small amount of an alkyl-substituted phenanthrene as a plasticizer.

7. A phonograph record comprising a vinyl resin base, composed of a conjoint polymer of vinyl chloride with vinyl acetate, a mixed filler in an amount at least about equal by weight to said vinyl resin, said mixed filler containing a substantial proportion each of finely-divided charcoal of vegetable origin and finely-divided inorganic abrasive material having a hardness of at least 5 on Mohs' scale, and a small amount of retene as a plasticizer.

8. A phonograph record comprising a vinyl resin base, composed of a conjoint polymer of vinyl chloride with vinyl acetate, a mixed filler in an amount at least about equal by weight to said vinyl resin, said mixed filler containing a substantial proportion each of finely-divided charcoal of vegetable origin and finely-divided inorganic abrasive material having a hardness of at least 5 on Mohs' scale, and a small amount of a fatty acid pitch as a plasticizer.

VICTOR YNGVE.